E. RUTLEDGE.
EYEGLASSES.
APPLICATION FILED MAR. 31, 1919.

1,320,931.  Patented Nov. 4, 1919.

WITNESSES:
K. A. Thomas

INVENTOR
Earl Rutledge
BY
Victor J. Evans
ATTORNEY

UNITED STATES PATENT OFFICE.

EARL RUTLEDGE, OF HOPE, ARKANSAS, ASSIGNOR OF ONE-HALF TO WALTER C. WALLIS, OF HOPE, ARKANSAS.

EYEGLASSES.

1,320,931.          Specification of Letters Patent.          Patented Nov. 4, 1919.

Application filed March 31, 1919. Serial No. 286,316.

*To all whom it may concern:*

Be it known that I, EARL RUTLEDGE, a citizen of the United States, residing at Hope, in the county of Hempstead and State of Arkansas, have invented new and useful Improvements in Eyeglasses, of which the following is a specification.

The present invention has reference to eye glasses or spectacles.

High power arc lamp lights, employed in connection with moving picture machines seriously affect the operator's eyes, and it is the primary object of the present invention to produce an eye glass or spectacle in which each of the lenses comprises an upper transparent section and a lower translucent section or panel, and to further arrange over the transparent panels a shade, the translucent panels preventing the glare of the lamp affecting the operator's eyes, while the upper transparent panels permit of the operator obtaining a clear view of the pictures thrown on a screen.

A further object of the invention is to produce an article of this character which may be cheaply manufactured and which will be thoroughly efficient for the purpose devised.

Other objects and advantages will appear as the nature of the invention is better understood, reference being had to the accompanying drawings, in which.

Figure 1:
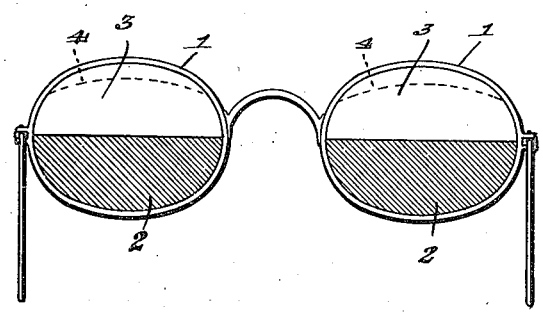
Figure 1 is a rear view of an eye glass or spectacle constructed in accordance with this invention.
Figure 2:
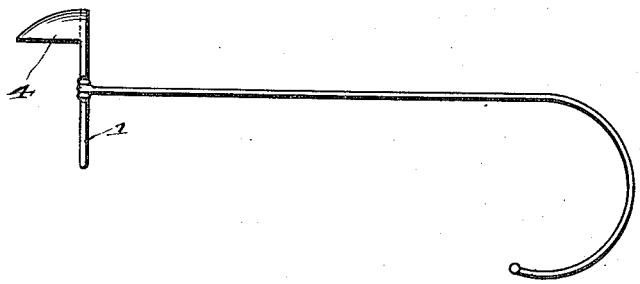
Fig. 2 is a side elevation thereof.

While my improvement may be in the nature of an eye glass, the same, in the accompanying drawing is illustrated in connection with a pair of spectacles. The frame 1 may be of the ordinary construction, and the lenses may each be constructed of a pair of panels or a single lens covered to provide a lower translucent panel 2 and an upper transparent panel 3. The frame, at the lens receiving portions thereof is formed with an outwardly projecting hood 4, the same providing a shade and being arranged directly above the transparent panels. The hood 4 has its lower edge straight, but is arched or curved upon its outer face to its connection with the frames of the lens.

With an eye protector constructed as above described, it will be seen that the translucent panels of the lenses protect the operator's eyes from the high glare of the lamp employed in picture making machines, while the transparent panels of the lens permit of the operator having a direct view of the screen and the pictures thrown thereon. The hood or shade 4 protects the operator's eyes from overhead lights, and it is thought that the simplicity of the construction and the advantages thereof will be appreciated without further description.

Having thus described the invention, what is claimed as new, is:—

An eyeglass or spectacle including a frame and lenses in the frame, said lenses comprising each a lower translucent panel and an upper transparent panel, an outwardly extending hood on the lens receiving portions of the frame arranged at the top thereof and comprising a lower straight portion and an upper portion which is arched or curved to its connection to the frame, and the said hood partly covering the transparent panel of the lens.

In testimony whereof I affix my signature.

EARL RUTLEDGE.